(12) United States Patent
Bukkems et al.

(10) Patent No.: US 12,742,529 B2
(45) Date of Patent: Sep. 22, 2026

(54) LIGHTING DEVICE WITH MULTIPLE LIGHT SOURCES AND LIGHT GUIDE WITH BEND ANGLE THAT EQUALS CONNECTION ANGLE OF THE CONNECTION BETWEEN LIGHT SOURCES

(71) Applicant: SIGNIFY HOLDING B.V., Eindhoven (NL)

(72) Inventors: Peter Johannes Martinus Bukkems, Deurne (NL); Barry Mos, Limburg (NL); René Beltman, Vught (NL); Marcus Theodorus Maria Lambooij, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/145,988

(22) PCT Filed: Dec. 20, 2023

(86) PCT No.: PCT/EP2023/087008
§ 371 (c)(1),
(2) Date: Jul. 7, 2025

(87) PCT Pub. No.: WO2024/149590
PCT Pub. Date: Jul. 18, 2024

(65) Prior Publication Data

US 2026/0218867 A1 Jul. 30, 2026

(30) Foreign Application Priority Data

Jan. 9, 2023 (EP) .................................... 23150687

(51) Int. Cl.
*F21S 8/00* (2006.01)
*F21V 8/00* (2006.01)
(Continued)

(52) U.S. Cl.
CPC ............ *F21S 8/037* (2013.01); *G02B 6/0073* (2013.01); *G02B 6/0091* (2013.01); *F21Y 2105/12* (2016.08); *F21Y 2115/10* (2016.08)

(58) Field of Classification Search
CPC ... F21Y 2115/10; F21Y 2105/10; F21S 8/037; G02B 6/0073; G02B 6/0091
See application file for complete search history.

(56) References Cited

U.S. PATENT DOCUMENTS

| | | | |
|---|---|---|---|
| 5,823,655 | A | 10/1998 | Brooks |
| 10,422,943 | B2 | 9/2019 | Munoz Fernandez et al. |

(Continued)

FOREIGN PATENT DOCUMENTS

| | | | |
|---|---|---|---|
| CN | 109296984 | A | 2/2019 |

*Primary Examiner* — Robert J May

(57) ABSTRACT

The invention provides a lighting device, comprising multiple light sources and a light guide, enabling homogenously illuminated corners and multiple angles for light guide systems without interruption of the light. The lighting device comprises n light sources, n being equal to (2) or more, each light source comprising a LED array on a carrier having two carrier ends. The LED array comprises repeating lighting elements, each having an optical center. The lighting device further comprises n−1 connections between carrier ends of neighboring light sources, each connection having a non-zero and non-straight connection angle an−1, and a light guide having an edge surface separating a first side surface and an opposite second side surface. At each of the n−1 connections, two or more lighting elements at each carrier end of the neighboring light sources have a pitch, which is maintained across the connection.

14 Claims, 5 Drawing Sheets

(51) Int. Cl.
*F21Y 105/12* (2016.01)
*F21Y 115/10* (2016.01)

(56) References Cited

U.S. PATENT DOCUMENTS

| | | | |
|---|---|---|---|
| 2017/0030561 | A1 | 2/2017 | Dix |
| 2018/0095216 | A1 | 4/2018 | Munoz Fernandez et al. |
| 2020/0355350 | A1 | 11/2020 | Kay et al. |
| 2020/0374995 | A1 | 11/2020 | Bretschneider et al. |
| 2022/0107455 | A1 * | 4/2022 | Santoro ................ G02B 6/0028 |

* cited by examiner

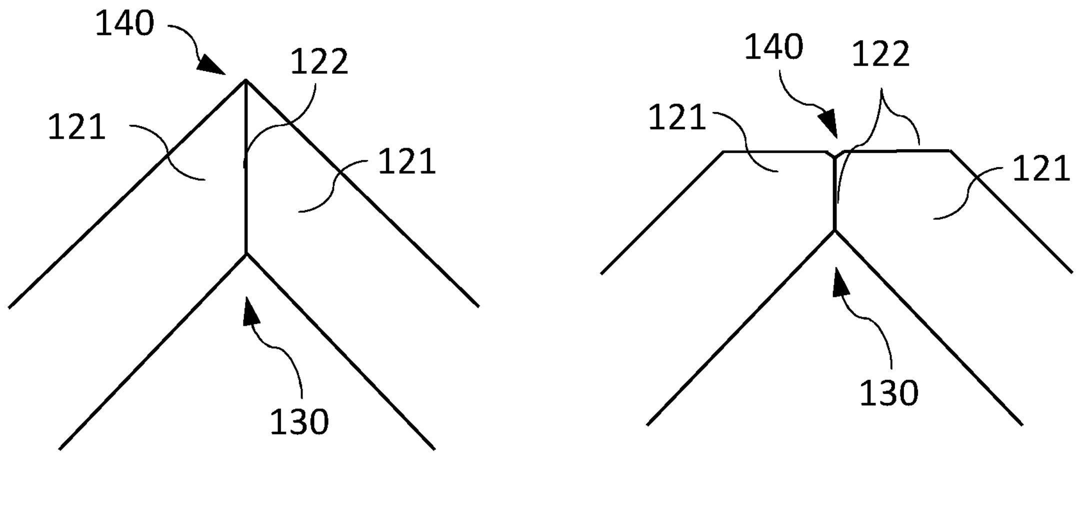
FIG. 6A
FIG. 6B
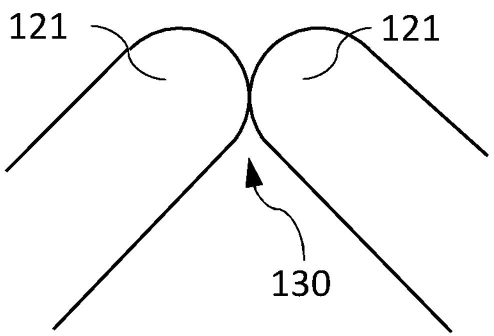
FIG. 6C

LIGHTING DEVICE WITH MULTIPLE LIGHT SOURCES AND LIGHT GUIDE WITH BEND ANGLE THAT EQUALS CONNECTION ANGLE OF THE CONNECTION BETWEEN LIGHT SOURCES

CROSS-REFERENCE TO PRIOR APPLICATIONS

This application is the U.S. National Phase application under 35 U.S.C. § 371 of International Application No. PCT/EP2023/087008, filed on Dec. 20, 2023, which claims the benefit of European Patent Application No. 23150687.4, filed on Jan. 9, 2023. These applications are hereby incorporated by reference herein.

FIELD OF THE INVENTION

The invention relates to a lighting device comprising light sources and a light guide.

BACKGROUND OF THE INVENTION

The introduction of light emitting diode light sources has enabled more flexibility in the design of lighting devices. In combination with light guides, surfaces can be created that are illuminated.

U.S. Pat. No. 10,422,943B2 discloses an example of a luminaire with a light guide. An array of solid state lighting elements is arranged around the edge of the light guide, and the light guide has a flat light output surface, which is visible in use of the luminaire.

US2020355350A1 discloses a lighting fixture in which at least first and second adjacent LED light strips are connected at an angle to one another. A distance between end LEDs is approximately the same as a distance between equally spaced LEDs on the surface of both the first and second LED strips.

Additional flexibility is needed to create fully illuminated surfaces when the shape of the lighting device and the light guide system become more complex.

SUMMARY OF THE INVENTION

The present invention seeks to provide a lighting device, comprising multiple light sources and a light guide, enabling homogenously illuminated corners and multiple angles for light guide systems without interruption of the light.

The lighting device comprises n light sources, n being equal to 2 or more. Each light source comprises a LED array on a carrier having two carrier ends at opposite sides of the LED array. The LED array comprises repeating lighting elements, wherein each lighting element has an optical center. The lighting device further comprises n−1 connections between carrier ends of neighboring light sources of the n light sources, each connection having a non-zero and non-straight connection angle $\alpha_{n-1}$, and a light guide having an edge surface separating a first side surface and an opposite second side surface.

At each of the n−1 connections, two or more lighting elements at each carrier end of the neighboring light sources have a pitch, measured between the optical centers of the lighting elements, which is maintained across the connection. The light guide is mounted on the n light sources such that each LED array is arranged to emit light into the light guide via the edge surface, and wherein, at each of the n−1 connections, the edge surface of the light guide has a bend with a bend angle, the bend angle being equal to the connection angle $\alpha_{n-1}$ of the respective connection.

The lighting device of this invention solves the problem of dark, not homogeneously illuminated corners in light guide systems. Typically, two light sources and two light guides need to be connected in the corner, for example with an additional corner piece. In the lighting device of this invention the light guide corners are fully illuminated, which is achieved by using one single light guide having a bend in each respective corner, and LED light sources connected in the corner such that the pitch in the corner is maintained across the connection. The invention offers flexibility in the number of connections and the number of corners comprised by the lighting device. The connection angle of each connection can be chosen within a large range of different angles. Thus, a lighting device can be created which offers high design flexibility and a very pleasing appearance of fully illuminated surfaces, especially in the corners of the light guide system. The lighting device could for example be implemented as light guide system for an indoor luminaire embedded in or around the ceiling of a room, but also many other possible applications are possible.

The LED array is arranged on a carrier like for instance a substrate, that may be rigid (made from e.g. a polymer, glass, quartz, metal or sapphire) or flexible (e.g. made of a polymer or metal e.g. a film or foil). The carrier may also be called a LED board, a printed circuit board, or PCB. The carrier may have an elongated shape, such as for example a strip-like appearance having two long sides in parallel to the LED array, and two short sides at the carrier ends. The carrier ends are located on opposite sides of the carrier and of the LED array located on the carrier. Thus, the light source has a first carrier end on one end of the LED array and a second carrier end on the opposite end of the LED array.

Each connection has a non-zero and non-straight connection angle $\alpha_{n-1}$. A non-zero connection angle is a connection angle different from 0°. A non-straight connection angle needs to be understood as a connection angle different from 180°, Each LED array comprises repeating lighting elements, each having an optical center. In different examples, the lighting elements may comprise different light emitting components. Depending on the specific implementation, the optical center may be the same as the mechanical center of the component. But the optical center may also deviate from the mechanical center of the component, depending on how the light is generated by the component. The lighting element may also comprise more than one component. In such a case the optical center needs to be understood as the combined optical center of all the components comprised by the lighting element.

The light guide has an edge surface separating a first side surface and a second side surface. In other words, the light guide may have the basic shape of a plate, wedge, or blade, having a thickness, a width, and a height. The thin edge surface defines the thickness of the light guide plate and is separating two major side surfaces having a width and a height.

The light guide has the basic shape of a plate, but the light guide of this invention is not flat, it has a three-dimensional structure. To be suitable for the lighting device of this invention the flat light guide plate needs to be designed and produced to match the lighting device design.

The light guide has a bend at a bend angle at each connection of two light sources. The angle of the bend is measured at the edge surface of the light guide, but the bend may run along a bending line from the edge surface across the side surfaces to the opposite edge of the light guide. Thus, also the side surface, which is visible during the operation of the lighting device, may have a bend with a bend angle, whereas the other side surface may have a bend of 360 degrees minus the bend angle. In an example of a visual comparison, a light guide having one bend may look like a half-open book which is placed upright. The edge surface of the light guide is mounted such that all lighting elements emit light into the edge surface to create a smoothly illuminated side surface, including the corners of the light guide.

The LED array comprises repeating lighting elements, which are placed at a pitch. The pitch can also be called distance or spacing. For the lighting device of this invention, it is essential that the pitch across the connection is maintained. The pitch is measured using at least two lighting elements at each carrier end of the neighboring light sources. In other words, the pitch is measured across at least the last two lighting elements closest to the connection on the LED arrays on both sides of the connection.

The pitch is measured between the optical centers of the lighting elements and is maintained across the connection. Thus, the pitch is constant between the at least two lighting elements at the carrier end of the first of the neighboring light sources, between the at least two lighting elements at the carrier end of the second of the neighboring light sources, and between lighting elements across the connection. In other words, the pitch on the left side of the connection is equal to the pitch at the right side of the connection is equal to the pitch across the connection.

At each of the n−1 connections, the carrier ends may comprise chamfers together forming a miter joint under the connection angle $\alpha_{n-1}$. The width of the carrier may hamper the design possibilities. Introducing chamfered carrier ends enables the placement of lighting elements closer to the connection and at a smaller pitch.

Two neighboring carriers may have chamfered ends, meaning that the carrier ends may not have a standard rectangular shape. One corner of the rectangular carrier end is removed to create a chamfered edge, also called a transitional edge or a bevel. The angle of the chamfer changes depending on the connection angle of the respective connection. Connecting the two chamfered carrier ends forms a miter joint under the connection angle of the respective connection.

In addition, the carrier ends may each comprise two chamfers meeting at an angle of 90 degrees. Just like the miter joint with one chamfer, the joint enables placement of lighting elements close to the connection. However, in addition it also enables more efficient space usage of the light guide system at the connection inside the corner.

On a carrier end with two chamfers, both corners at the end of the rectangular carrier are replaced by chamfers. The first chamfer is constructed at an angle as described for the solution with one chamfer. The second chamfer is constructed at a right angle on the first chamfer. Connecting the two chamfered carrier ends forms a miter joint under the connection angle of the respective connection, and additionally removes the protruding corner of the carriers to enable mounting the light guide system closer into a corner.

Alternatively, at each of the n−1 connections, the carrier ends may have a rounded shape. Carrier ends with rounded shapes have the advantage that the same carrier can be connectable at different angles, reducing design and manufacturing costs. The possible connection angles may be limited however, since in this specific solution the pitch across the connection increases with increasing connection angle due to the carrier width. Thus, at larger connection angles, the pitch may not be maintained across the connection.

A rounded shape of the carrier end may also be described as a carrier end shaped in a full radius or shaped in a semi-circle. The carrier end has no sharp edges like a rectangular end or a chamfered end.

In an example, each lighting element may consist of one LED component. In this example the repeating lighting elements all consist of one single LED component. This may be the case for example in a lighting device able to generate white light only, or for example in a lighting device using integrated RGB LED components.

In another example, each lighting element consists of two LED components. In such an example the repeating lighting elements all consist of two LED components, generally two different types of LED components. In an example, each lighting element may comprise a warm white LED and a cold white LED, or in another example each lighting element may comprise a white LED and a RGB LED component.

In yet another example, each lighting element consists of three LED components. In such an example the repeating lighting elements all consist of three LED components, generally three different types of LED components. In an example, each lighting element may comprise a warm white LED, a cold white LED, and a RGB LED component. In another example each lighting element may comprise independent red, green, and blue LED components.

The LED arrays of the n light sources may together constitute a combined LED array such that the pitch is maintained across all lighting elements of the lighting device. In earlier examples the pitch was maintained across the two or more lighting elements at each carrier end of the neighboring light sources and across their connection. In this example the pitch is maintained across the whole lighting device. In other words, the pitch of the lighting elements is constant for all LED arrays comprised in the lighting device. Additionally, the pitch is constant across all connections of all neighboring LED arrays. Thus, the distance from one lighting element to the next is the constant, irrespective of where it is measured inside the lighting device.

In addition, at each of the n−1 connections, the bend of the light guide may have a centerline radius of curvature, and the centerline of the light guide may be aligned with the optical centers of the lighting elements. An essential feature of the invention is that the pitch is maintained across the connection and that the light guide is mounted such that all lighting elements emit light into the edge surface of the light guide. Depending on the specific implementation, a simple bend in the light guide may not be sufficient to satisfy the condition. The best and most homogeneous illumination of the light guide is achieved with a bend having a radius of curvature. And more particular when the centerline radius of curvature is chosen such that the centerline of the light guide is aligned with the optical centers of the lighting elements.

The centerline radius of curvature of the light guide is defined as the distance from the center of curvature to the centerline (axis) of the light guide. It may essentially be the same as or sufficiently close to the neutral bending line of the light guide, or the optical center of the light guide.

Alternatively or in addition, at each of the n−1 connections, the bend of the light guide may have a centerline radius of curvature, and the ratio of the centerline radius of curvature and the pitch may be in a range of 0.45 to 0.55. A different or additional way to optimize the homogeneous illumination of the light guide corners is to relate the centerline radius of curvature of the light guide to the pitch. More specifically, the best and most homogenous illumination of the light guide is achieved when the bend has a centerline radius of curvature which is approximately half the pitch.

Each of the connection angles $\alpha_{n-1}$ may be an angle between 5 and 175 degrees, or between 185 and 355 degrees. The lighting device of this invention offers a high degree of flexibility in choosing different connection angles. In typical implementations connection angles may be around 90 degrees, but essentially all angles can be implemented if the angle is five degrees or more away from a zero angle or a straight angle.

In an example, the number of light sources n may be at least 4. Having at least four light sources comprised in the lighting device may be a typical implementation of the invention. Four light sources may form a rectangular or square shape, which could be for example mounted in or around the ceiling of a room such that a rectangular or squared light guide system indoor luminaire is created.

For each light source, the carrier may have a longitudinal axis, and the LED array may be positioned on one side of the longitudinal axis. Positioning the LED array on one side of the longitudinal axis of the carrier may create space on the other side of the carrier. The space may be used for example for connectors, or for additional components which may be required for the operation of the lighting device.

In a further example, each light source may comply to the ZHAGA standards. The ZHAGA standard aims to standardize the interfaces of components of LED luminaires, such as for example LED arrays and connectors. ZHAGA specifications are defined in "*The books of ZHAGA*" and define the necessary conditions for interoperability.

Each LED array may have lighting elements with a lighting element width in a direction parallel to a longitudinal axis of the respective carrier. The pitch may be smaller than 2 times the lighting element width. A smaller pitch is desired and enables different advantages, such as a more homogeneous illumination, a bezel which can be reduced in height, and sharper corners with a smaller centerline radius of curvature.

Each lighting element has a width, which is measured in a direction parallel to a longitudinal axis of the carrier. For implementations in which the lighting elements consist of one LED components, the width is the width of the LED component. For implementation in which the lighting elements consist of a cluster of LED components, the width needs to be understood as the width of the whole cluster of LED components.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 6*a*-6*c* schematically depict examples of carriers;

The schematic drawings are not necessarily to scale.

DETAILED DESCRIPTION OF THE EMBODIMENTS

The present invention seeks to provide a lighting device, comprising multiple light sources and a light guide, enabling homogenously illuminated corners and multiple angles for light guide systems without interruption of the light.

Figure 1:
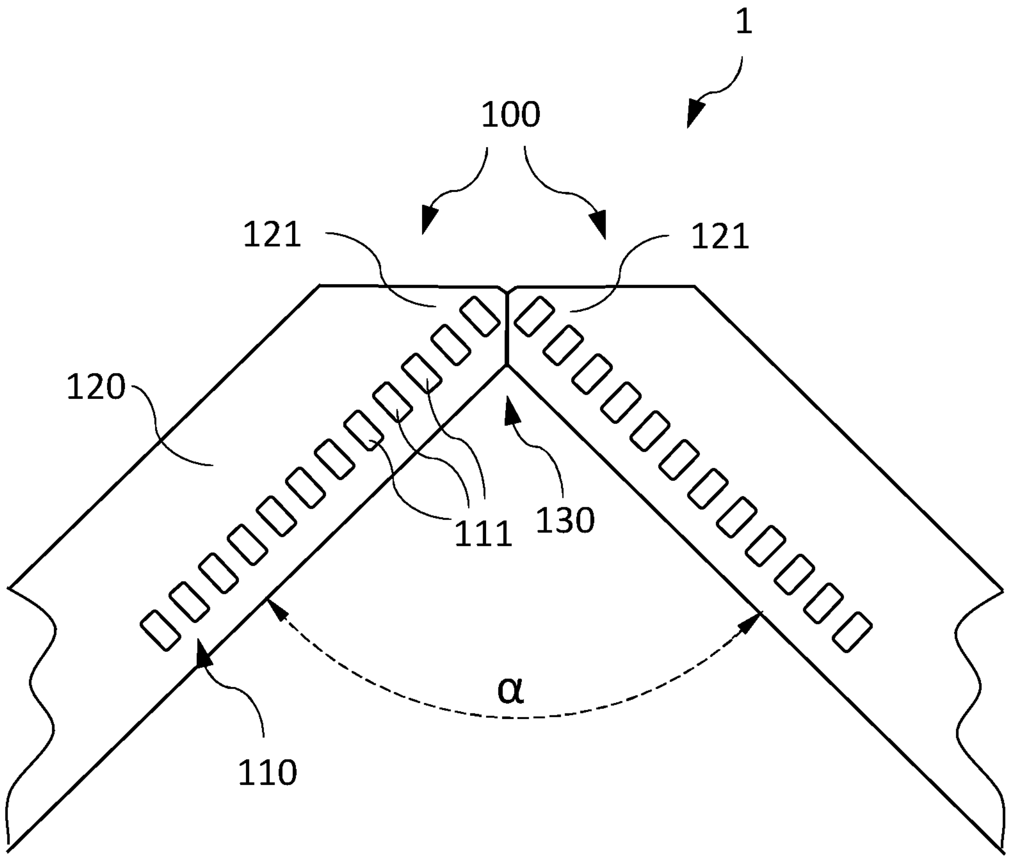
FIG. 1 shows a view of a connection of the lighting device.

FIG. 1 shows a schematic view of the lighting device 1, more particularly of the light sources 100 and the connection 130. The lighting device 1 comprises n light sources 100, wherein n equals two or more. n may be any number of light sources which is greater than two. However, typical examples may be n=3 to create a triangular lighting device 1, n=4 to create a rectangular or squared lighting device 1, or n=6 to create a hexagonal lighting device 1.

Each light source 100 comprises a LED array 110 on a carrier 120 having two carrier ends 121 at opposite sides of the LED array 110. The LED array 110 comprises repeating lighting elements 111.

The n light sources 100 contact each other at n−1 connections 130. At each connection 130, the carrier ends 121 of the two neighboring light sources 110 are connected under a non-zero and non-straight connection angle $\alpha_{n-1}$. The lighting device 1 of this invention offers flexibility in the number of connections and the number of corners comprised by the lighting device. The connection angle $\alpha$ of each connection 130 can be chosen within a large range of different angles. Essentially, the connection angle can be any angle, except a zero angle (an angle of) 0°, or a straight angle (an angle of) 180°. Angles close to a zero angle or a straight angle, within a tolerance of plus or minus 5 degrees, are not suitable either for implementing the lighting device 1 of this invention.

The connection 130 between the light sources 100 may be an electrical connection, or it may be a mechanical connection. A connection may already be accomplished by placing two neighboring light sources 100 next to each other. In such an example the light sources 100 may be kept in place by other components of the lighting device 1, like for example connectors at other locations on the carrier, or (parts of) a housing of the luminaire.

Figure 2:
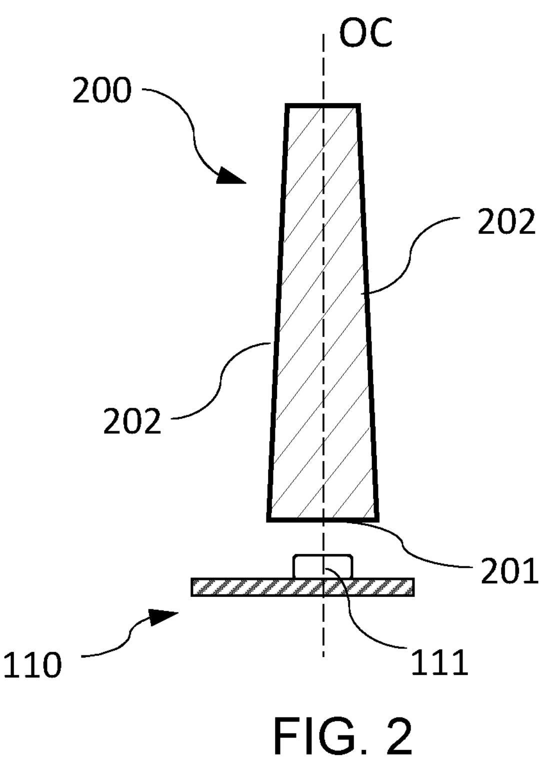
FIG. 2 shows a cross section of the lighting device.

FIG. 2. shows a schematic view of a cross section of the lighting device 1 to illustrate the way the light guide 200 is mounted on the light sources 100. The light guide 200 has an edge surface 201 separating a first side surface 202 and an opposite second side surface 202. The light guide 200 is mounted on the n light sources 100 such that each LED array 110 is arranged to emit light into the light guide 200 via the edge surface 201. The illumination of the light guide can be further optimized by aligning the optical center of the lighting elements 111 on the LED array 110 with the optical center or the neutral line of the light guide 200. The optical center or neutral line can in many cases be approximated by the center line of the light guide 200, which is the geometric middle line of the light guide 200.

Figure 3:
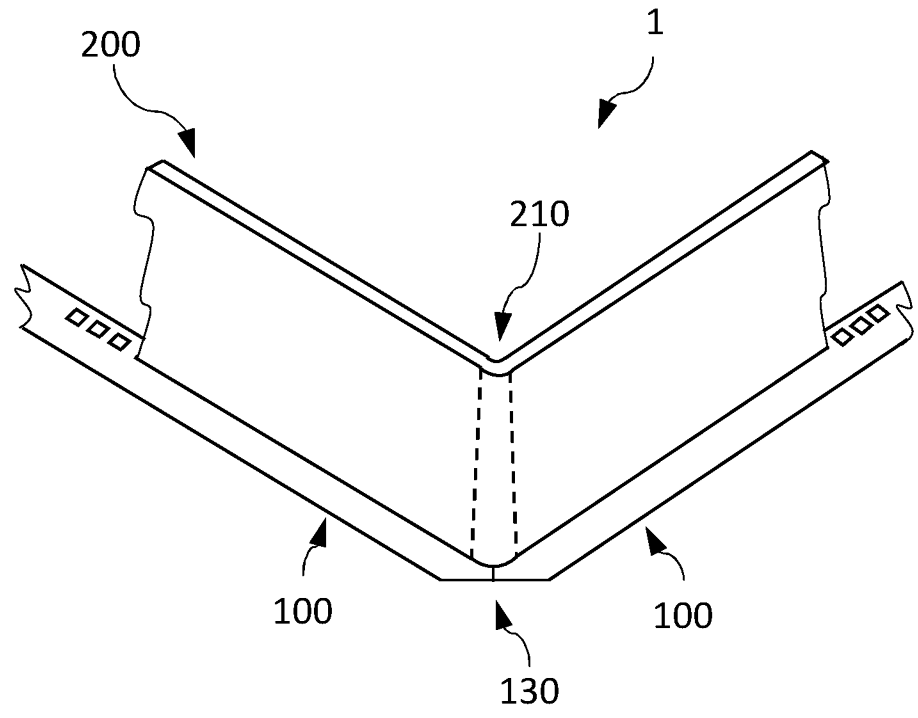
FIG. 3 is a schematic three-dimensional view of a connection.

FIG. 3 schematically depicts a three-dimensional view of a section of the lighting device 1. The lighting device 1 comprises n light sources 100 and n−1 connections 130. An example of one connection 130 of the lighting device 1 is schematically shown here. Two neighboring light sources 100 are connected at a connection 130. The light guide 200 is mounted on top of the light sources 100, such that each lighting element 111 of each LED array 100 is arranged to emit light into the light guide 200 via the edge surface 201. At each of the n−1 connections 130, the edge surface 201 of the light guide 200 has a bend 210 with a bend angle, the bend angle being equal to the connection angle $\alpha_{n-1}$ of the respective connection 130.

Figure 4:
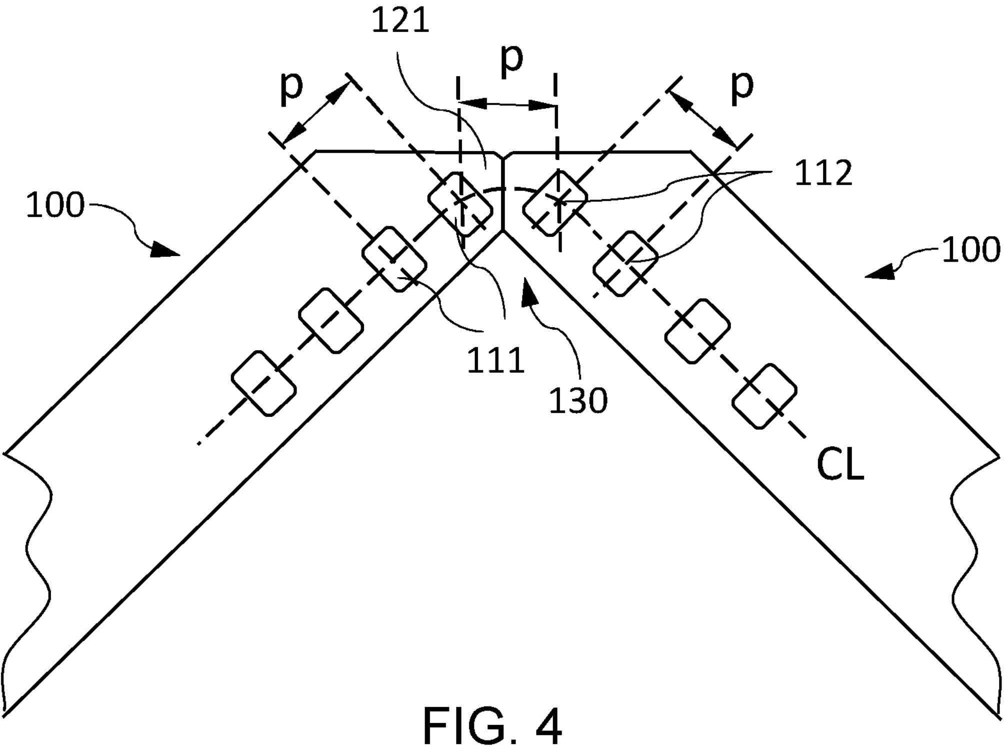
FIG. 4 shows details of the lighting device.

FIG. 4 shows a schematic view of two neighboring light sources 100 and the connection 130. At each of the n-connections 130, two or more lighting elements 111 at each carrier end 121 of the neighboring light sources 100 have a pitch p. The pitch p is measured between the optical centers 112 of the lighting elements 111 and is maintained across the connection 130. How the pitch is determined is indicated in FIG. 4. The two lighting elements 111 closest to the left side of the connection 130 have a pitch p, or distance, between the optical centers 112 of the two lighting elements 111. The same is true for the two lighting elements 111 closest to the right side of the connection 130. The pitch p to the left of the connection 130 is equal to the pitch to the right of the connection 130, is equal to the pitch across the connection 130. The pitch p across the connection 130 is measured from the optical center 121 of the lighting element 111 immediately left of the connection 130, along the centerline CL of the light guide 200, to the optical center 121 of the lighting element 111 immediately right of the connection 130. Thus, the pitch p across the connection 130 is not measured in a straight, shortest line between the optical centers 121, but follows the bend and curvature of the light guide 200, indicated by its centerline CL.

The pitch p is constant and is maintained across the connection 130. The pitch may be regarded as maintained if the variation of the distances between the lighting elements 111 is less than 10%, or preferably less than 5%. In addition, the pitch may also be maintained across the entire lighting device 1. In such an example, the LED arrays 110 of the n light sources 100 together constitute a combined LED array such that the pitch is maintained across all lighting elements 111 of the lighting device 1.

Figure 5:
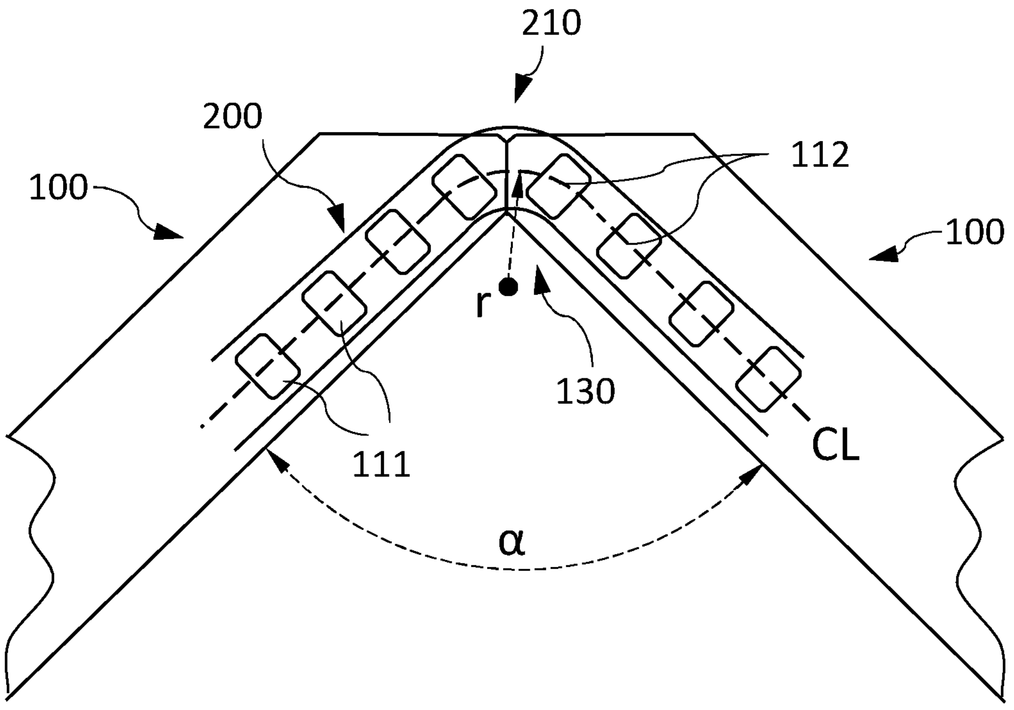
FIG. 5 shows details of the lighting device.

FIG. 5 shows another example of a connection 130 between neighboring light sources 100, and the light guide 200 mounted on top the connection 130. In this example, the bend 210 of the light guide 200 has a bend angle $\alpha$ and additionally the bend 210 has a centerline radius of curvature r. The centerline radius of curvature r is chosen such that the centerline CL of the light guide 200 is aligned with the optical centers 112 of the lighting elements 111. The light guide 200 is mounted such that all lighting elements 111 emit light into the edge surface of the light guide 200. To achieve homogeneous illumination of the light guide 200, the light guide 200 may be required to have a bend 210 at a certain radius. This may be further optimized when the centerline radius of curvature r is chosen such that the centerline CL of the light guide 200 is aligned with the optical centers 112 of the lighting elements 111.

The centerline radius of curvature of the light guide 200 is defined as the distance from the center of curvature to the centerline CL of the light guide 200. It may essentially be the same as or sufficiently close to the neutral bending line of the light guide 200, or the optical center of the light guide 200.

In another example the centerline radius of curvature may be dimensioned in relation to the pitch of the lighting elements 111 across the connection 130. The ratio of the centerline radius of curvature and the pitch may be 0.5, or it may be in a range of 0.45 to 0.55. In other words, optimal illumination is achieved when the centerline radius of curvature of the bend 210 is dimensioned to be half the pitch of the lighting elements 111. The deviation of the ratio of the centerline radius of curvature and the pitch may be less than 5%, or it may be less than 10%.

FIGS. 6*a*-6*c* schematically show different examples of carrier end 121 shapes. Several different shapes may be suitable for implementation in the lighting device 1 of this invention. Therefore, the three examples shown here do not represent all possible solutions and the skilled person will be able to define additional shapes for the carrier ends 121 which may be evenly appropriate.

FIG. 6*a* shows an example in which the carrier ends 121 comprise chamfers 122 together forming a miter joint 140 at the connection 130 under the connection angle $\alpha_{n-1}$. A typical carrier 120 of a LED array 110 has a rectangular shape. However, when used in the invention the width of the carrier 120 may hamper the design possibilities. Chamfered carrier ends 121 enable the placement of lighting elements 111 closer to the connection and at a smaller pitch. A chamfered edge may be created by removing one corner of the rectangular carrier end 121. Connecting the two chamfered carrier ends 121 forms a miter joint 140 under the connection angle of the respective connection.

The angle of the chamfer 122 changes depending on the connection angle of the respective connection 130. The angles of the chamfers 122 on both carrier ends 121 may be equal and may each be half of the connection angle. Other asymmetrical angles are possible as well when chosen such that the miter joint 140 creates a connection 130 under the connection angle of the respective connection 130.

FIG. 6*b* schematically depicts an example in which the carrier ends 121 each comprise two chamfers 122 meeting at an angle of 90 degrees. On a carrier end 121 with two chamfers 122, both corners at the end of the rectangular carrier 121 are replaced by chamfers 122. The first chamfer 122 is constructed at an angle as described above for the example using one chamfer 122. The second chamfer 122 is constructed at a right angle on the first chamfer 122. Connecting the two chamfered carrier ends 121 forms a miter joint 140 under the connection angle of the respective connection 130, and additionally removes the protruding corner of the carriers 121.

FIG. 6*c* depicts an example in which the carrier ends 121 have a rounded or semi-circular shape. Carrier ends 121 with rounded shapes may be connected at different angles at the connection 130, as long as the pitch is maintained across the connection.

FIGS. 7*a* to 7*d* schematically depict examples of lighting elements 111 and different aspects related to the lighting elements 111. Several different examples are shown in which the lighting elements 111 consist of different numbers of components 113. Next to the examples shown many other solutions may be suitable for implementation in the lighting device 1 of this invention.

Figure 7A:
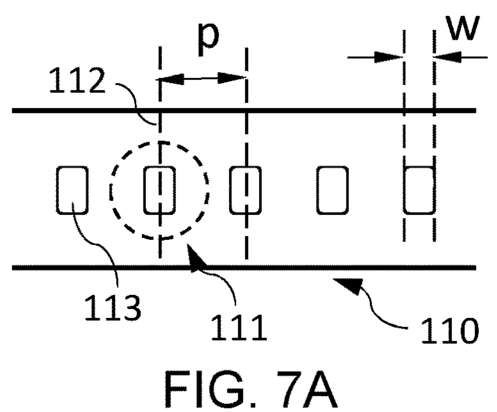
FIGS. 7*a*-7*d* schematically depict examples of lighting elements.

FIG. 7*a* shows an example of a lighting element 111 in which each lighting element consists of one LED component 113. The one LED component 113 is repeating on the LED array 110 at a pitch p. This may be implemented in lighting devices 1 able to generate white light only, or for example in a lighting device using integrated RGB LED components. The pitch p is measured between the optical centers of the lighting elements 111, which is in this example equal to the optical center of the LED component 113.

The lighting elements 111 have a lighting element width, indicated as w, in a direction parallel to a longitudinal axis of the respective carrier. In this example the lighting element width is the width of the LED component 113 of the lighting element 111. The pitch may be related to lighting element width. The illumination of the lighting device 1 and the light guide 200 may be optimized when the ratio of pitch to lighting element width is as small as possible. The pitch may be smaller than 2 times the lighting element width, or it may be smaller than 1.5 times the lighting element width.

Figure 7B:
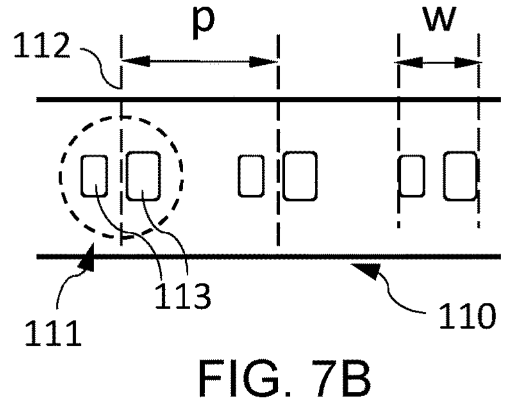

FIG. 7*b* schematically depicts an example in which each lighting element 111 consists of two LED components 113. Thus, each lighting element 111 consists of a cluster of two LED components 113. In most implementations the lighting element 111 may consist of two different LED components 113. Those could be for example a warm white LED and a cold white LED to generate tunable white light. Or those could also be a white LED and a RGB LED, or any other combination of two LED components 113.

The pitch p for a lighting element 111 consisting of a cluster of LED components 113 needs to be understood as the distance between the combined optical centers of the lighting elements 111, thus the LED cluster. Every LED component 113 of the lighting element 111 has an optical center. When combined into a lighting element 111, this lighting element 111 has a combined optical center in the center of the optical centers of the LED components. This definition of the pitch p is applied to all lighting elements 111 consisting of multiple LEDs 113.

The lighting elements 111 have a lighting element width, indicated as w, in a direction parallel to a longitudinal axis of the respective carrier. In examples in which the lighting element 111 consists of more than one LED component 113, the lighting element width needs to be understood as the width of the LED cluster. The lighting element width is measured in parallel to the longitudinal axis from the one side of the first LED component 113 to the other side of the last LED component 113 of the lighting element 111. The pitch may be related to lighting element width as described above.

Figure 7C:
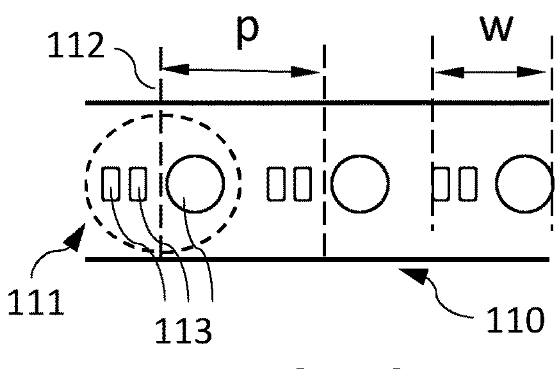
Figure 7D:
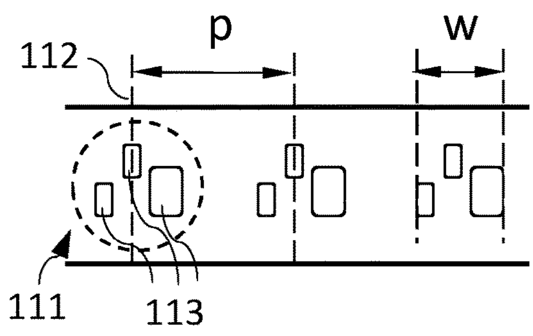

FIGS. 7*c* and 7*d* show additional examples wherein each lighting element 111 consists of three LED components 113. Thus, each lighting element 111 consists of a cluster of three LED components 113, generally three different LED components 113. The lighting element 111 may for example comprise a warm white LED, a cold white LED, and a RGB LED, or it may comprise any other combination of three LED components 113. The LED components 113 may be arranged next to each other on a longitudinal axis of the carrier 120 as depicted in FIG. 7*c*. Alternatively, the LED components 113 may also be arranged distributed around a longitudinal axis of the carrier 120 as shown in FIG. 7*d*.

Figure 8:
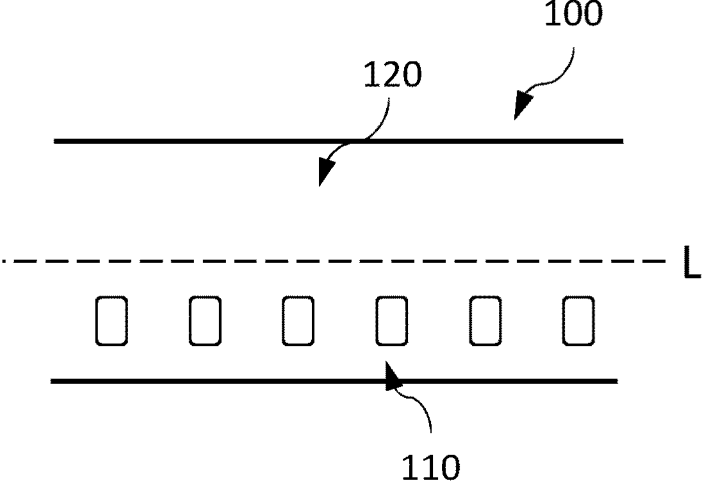
FIG. 8 shows an example of a light source.

FIG. 8. schematically depicts yet another example of a light source 100 and carrier 120. The carrier 120 has a longitudinal axis, and the LED array 110 may be positioned on one side of the longitudinal axis, here indicated as L. In this example the LED array 110 is positioned completely on one side of the longitudinal axis, but it may also be just slightly positioned to one side of the longitudinal axis such that the lighting elements of the LED array 110 still overlap with the longitudinal axis.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The various aspects discussed in this patent can be combined in order to provide additional advantages. Further, the person skilled in the art will understand that embodiments can be combined, and that also more than two embodiments can be combined.

The invention claimed is:

1. A lighting device comprising:

n light sources, n being equal to 2 or more, each light source comprising a LED array on a carrier having two carrier ends at opposite sides of the LED array, wherein the LED array comprises repeating lighting elements, wherein each lighting element has an optical center, n−1 connections between carrier ends of neighboring light sources of the n light sources, each connection having a non-zero and non-straight connection angle $\alpha_{n-1}$, and a light guide having an edge surface separating a first side surface and an opposite second side surface, wherein, at each of the n−1 connections, two or more lighting elements at each carrier end of the neighboring light sources have a pitch, measured between the optical centers of the lighting elements, which is maintained across the connection, wherein the light guide is mounted on the n light sources such that each LED array is arranged to emit light into the light guide via the edge surface, wherein, at each of the n−1 connections, the edge surface of the light guide has a bend with a bend angle, the bend angle being equal to the connection angle $\alpha_{n-1}$ of the respective connection, and wherein at each of the n−1 connections, the bend of the light guide has a centerline radius of curvature such that a centerline of the light guide is aligned with the optical centers of the lighting elements.

2. The lighting device of claim 1, wherein, at each of the n−1 connections, the carrier ends comprise chamfers together forming a miter joint under the connection angle $\alpha_{n-1}$.

3. The lighting device of claim 2 wherein the carrier ends each comprise two chamfers meeting at an angle of 90 degrees.

4. The lighting device of claim 1, wherein at each of the n−1 connections the carrier ends have a rounded shape.

5. The lighting device of claim 1, wherein each lighting element consists of one LED component.

6. The lighting device of claim 1, wherein each lighting element consists of two LED components.

7. The lighting device of claim 1, wherein each lighting element consists of three LED components.

8. The lighting device of claim 1, wherein the LED arrays of the n light sources together constitute a combined LED array such that the pitch is maintained across all lighting elements of the lighting device.

9. The lighting device of claim 1, wherein at each of the n−1 connections, the bend of the light guide has a centerline radius of curvature, and wherein a ratio of the centerline radius of curvature and the pitch is in a range of 0.45 to 0.55.

10. The lighting device of claim 1, wherein each of the connection angles $\alpha_{n-1}$ is an angle between 5 and 175 degrees, or between 185 and 355 degrees.

11. The lighting device of claim 1, wherein n is at least 4.

12. The lighting device of claim 1, wherein, for each light source, the carrier has a longitudinal axis, and the LED array is positioned on one side of the longitudinal axis.

13. The lighting device of claim 1, wherein each light source complies to the ZHAGA standards.

14. The lighting device of claim 1, wherein each lighting element has a lighting element width in a direction parallel to a longitudinal axis of the respective carrier, and wherein the pitch is smaller than 2 times the lighting element width.

* * * * *